United States Patent
Diaz Diaz et al.

(10) Patent No.: US 11,053,902 B2
(45) Date of Patent: Jul. 6, 2021

(54) DRIVE OF A PUMP

(71) Applicant: Siemens Aktiengesellschaft, Munich (DE)

(72) Inventors: Ignacio Diaz Diaz, Munich (DE); Markus Knorr, Augsburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/630,245

(22) PCT Filed: Jun. 13, 2018

(86) PCT No.: PCT/EP2018/065599
§ 371 (c)(1),
(2) Date: Jan. 10, 2020

(87) PCT Pub. No.: WO2019/011561
PCT Pub. Date: Jan. 17, 2019

(65) Prior Publication Data
US 2020/0378349 A1    Dec. 3, 2020

(30) Foreign Application Priority Data

Jul. 11, 2017 (EP) .................. 17180757

(51) Int. Cl.
*F02M 59/10* (2006.01)
*F04B 17/03* (2006.01)
(Continued)

(52) U.S. Cl.
CPC ......... *F02M 59/102* (2013.01); *F02B 63/041* (2013.01); *F02B 75/04* (2013.01); *F02M 39/02* (2013.01); *F04B 17/03* (2013.01)

(58) Field of Classification Search
CPC .... F02M 21/0245; F02M 59/10; F02M 37/08; F02M 51/04; F02M 37/043; F02M 59/00;
(Continued)

(56) References Cited

U.S. PATENT DOCUMENTS 6,295,972 B1 * 10/2001 Radue .................. F02M 57/027
123/499
9,574,556 B1 * 2/2017 Annen .................... F02B 71/00
(Continued)

FOREIGN PATENT DOCUMENTS

CN     2740803 Y    11/2005
CN     101900105 A  12/2010
(Continued)

OTHER PUBLICATIONS

PCT International Search Report and Written Opinion of the International Searching Authority dated Dec. 14, 2018 corresponding to PCT International Application No. PCT/EP2018/065599 filed Jun. 13, 2018.

*Primary Examiner* — Long T Tran
(74) *Attorney, Agent, or Firm* — Henry M. Feiereisen LLC

(57) ABSTRACT

A pump includes a cylinder having a working chamber which contains a fluid. A drive system including at least two linear motors which are connected electrically and/or mechanically in parallel moves a piston in the working chamber to bound the working chamber in the cylinder and to pressurize the fluid in the working chamber. A piston rod is connected to the piston and bundles a force applied by the drive system.

7 Claims, 1 Drawing Sheet

(51) Int. Cl.
*F02B 63/04* (2006.01)
*F02B 75/04* (2006.01)
*F02M 39/02* (2006.01)

(58) Field of Classification Search
CPC .... F04B 17/03; F04B 2201/0202; F04B 9/02; F04B 9/105
See application file for complete search history.

(56) References Cited

U.S. PATENT DOCUMENTS

| | | | | |
|---|---|---|---|---|
| 2003/0085308 A1* | 5/2003 | Parrish | ............. | F02M 61/08 239/585.1 |
| 2007/0158946 A1* | 7/2007 | Annen | ............. | F02B 71/04 290/1 R |
| 2007/0158947 A1* | 7/2007 | Annen | ............. | F02B 71/04 290/1 R |
| 2009/0206778 A1 | 8/2009 | Roh | | |
| 2015/0048109 A1 | 2/2015 | Wang | | |
| 2016/0186732 A1* | 6/2016 | Xi | ............. | F02M 51/04 417/415 |
| 2016/0348487 A1 | 12/2016 | Pichilingue | | |
| 2018/0128225 A1* | 5/2018 | Kounosu | ............. | F04B 9/105 |

FOREIGN PATENT DOCUMENTS

| | | |
|---|---|---|
| CN | 102094783 A | 6/2011 |
| CN | 203346679 U | 12/2013 |
| CN | 203463248 U | 3/2014 |
| CN | 108971864 A | 9/2016 |
| DE | 102007038529 A1 | 2/2009 |
| DE | 102008036528 A1 | 2/2010 |
| DE | 102012220068 A1 | 5/2014 |
| DE | 102014202937 A1 | 8/2015 |

\* cited by examiner

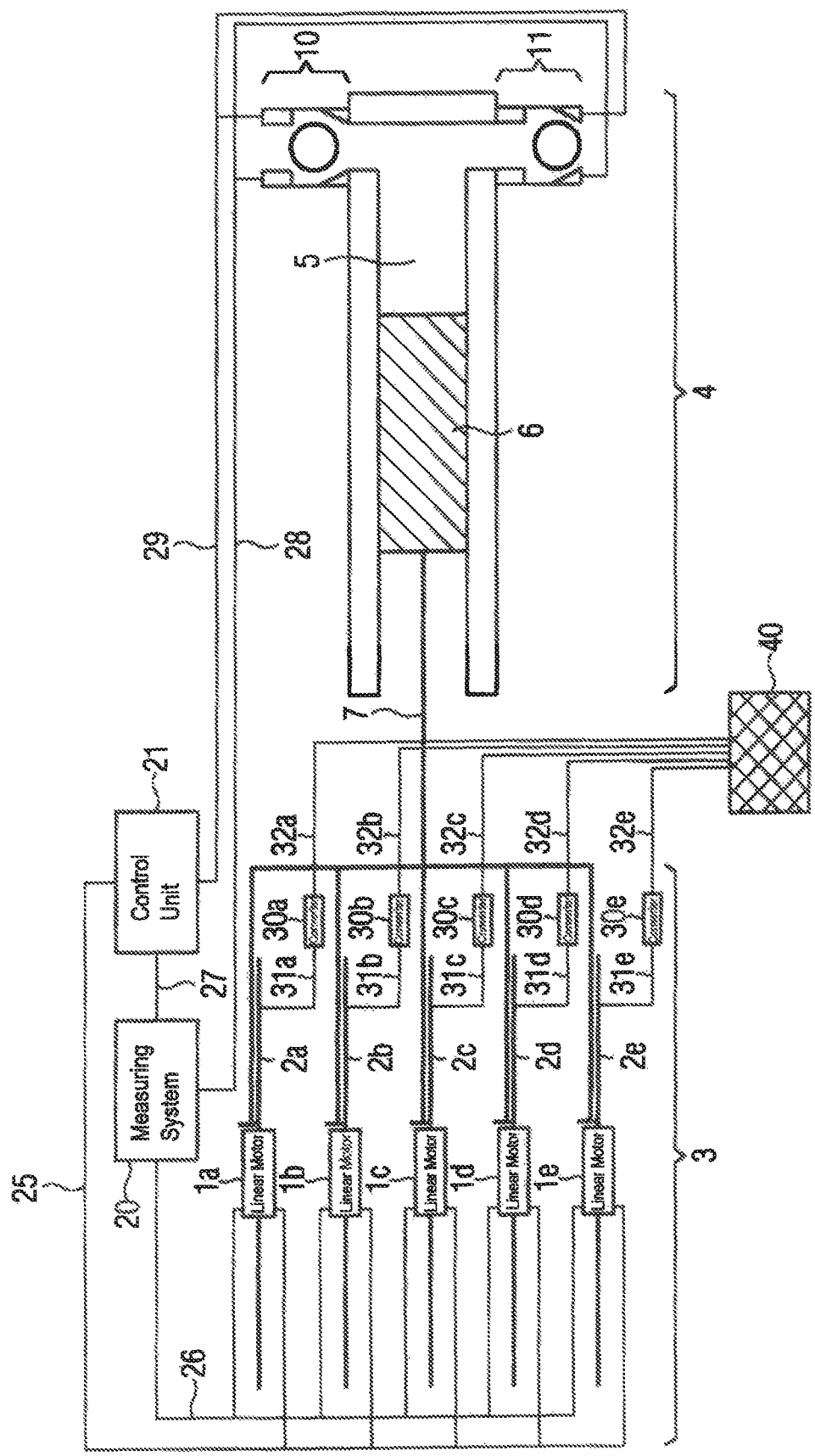

ved and construction is only profitable from a certain number of units, referred to in this regard as a standard product, the drive system of a pump, in particular of a fuel pump, comprises at least two linear motors in accordance with the invention. The linear motors are primarily of the same construction and therefore ready for series production. This is moreover advantageous in that linear motors can be kept in stock as spare parts and if necessary can be replaced quickly.

DRIVE OF A PUMP

CROSS-REFERENCES TO RELATED APPLICATIONS

This application is the U.S. National Stage of International Application No. PCT/EP2018/065599, filed Jun. 13, 2018, which designated the United States and has been published as International Publication No. WO 2019/011561 and which claims the priority of European Patent Application, Serial No. 17180757.1, filed Jul. 11, 2017, pursuant to 35 U.S.C. 119(a)-(d).

BACKGROUND OF THE INVENTION

The invention relates to a pump, in particular a fuel pump, having at least one working chamber, in which a piston, by means of a drive system, bounds the working chamber in a cylinder and pressurizes a fluid, in particular fuel, present in the working chamber.

Changing power requirements and operation under permanent load require pumps, in particular fuel pumps, which are robust on the one hand and agile on the other. In addition, downtimes are also to be kept as minimal as possible since these involve a high cost factor. Drives of fuel pumps are therefore frequently equipped with rotary motors and mechanical transmission components, for instance gearboxes and crankshafts. In particular, the mechanical transmission components are however prone to malfunctions and are high-maintenance. Moreover, a system of this type is very complex.

The subject matter of the patent application DE102007038529A1 is therefore a high pressure fuel pump with at least one working chamber in which fuel is pressurized with high pressure. The high pressure fuel pump is coupled to a linear motor so as to provide power.

The patent application DE102014202937A1 develops this approach further and describes a pump which has a pump cylinder head with a pump cylinder and a pump tappet which can be moved to and fro in a translatory manner in a cylinder guide embedded into the pump cylinder. The pump tappet interacts with a linear drive on the drive side. The linear drive is mechanically connected to the pump tappet in a manner free of play.

If only one single, conventional linear motor is used as a drive for a pump, this must, however, be designed and built especially for one type of pump. In addition, robust bearings are required for linear motors, which can absorb high starting power. A construction of a linear motor is only profitable if this is used in a product with a high number of units. The linear motor can also be designed so that it exceeds the required nominal values. Pump-specific or oversized linear motors are in general very expensive, however.

The object underlying the invention is to create a pump-specific, but nevertheless favorable drive for fuel pumps.

SUMMARY OF THE INVENTION

The object is achieved by a pump, in particular a fuel pump, having at least one working chamber, in which a piston, by means of a drive system, bounds the working chamber in a cylinder and pressurizes a fluid, in particular fuel, present in the working chamber, wherein the drive system comprises at least two linear motors.

Linear motors are preferably designed as direct drives and are therefore characterized by low noise emissions and a high power density. They enable translatory movements without gearboxes, which is why they are low-wear and low-maintenance. The precondition for a compact design additionally involves omitting the gearbox.

A development of just one, in particular a large, linear motor is very expensive. Since the development and construction of a linear motor is only profitable from a certain number of units, referred to in this regard as a standard product, the drive system of a pump, in particular of a fuel pump, comprises at least two linear motors in accordance with the invention. The linear motors are primarily of the same construction and therefore ready for series production. This is moreover advantageous in that linear motors can be kept in stock as spare parts and if necessary can be replaced quickly.

A scaling of feed force and power is achieved by varying a linear motor number. Therefore high numbers of units of a linear motor can be manufactured, wherein different requirements in terms of power and/or feed force can be handled. A redundancy can additionally be enabled by varying the number of linear motors, by more linear motors being installed than are actually required.

In a preferred embodiment of the invention, at least 20 linear motors connected electrically and/or mechanically in parallel drive the fuel pump.

A particularly safe and reliable operation, which moreover enables an adequate degree of scaling steps, is achieved with a drive system comprising 40 to 50 linear motors. However, 128 and more linear motors can also form a drive system.

With smaller pumps, a drive system with a smaller number of linear motors is also possible. A parallel circuit of a number of linear motors also serves to increase the feed force. In order to reduce a complexity, the linear motors forming the drive system are preferably arranged in parallel on a support.

Advantageously each one linear motor has a mechanical power between 40 kW and 85 kW and provides a feed force of up to 20 kN.

The drive system preferably has at least one measuring system, at least one control unit for activating the linear motors and at least one system for data transmission.

The measuring system preferably determines a position and/or speed of the linear motors on their respective track. The position and/or speed can also be realized, preferably encoderlessly, by way of monitoring the stress in the linear motor.

Advantageously the drive system has precisely one control unit. The control unit activates the drive system. The drive system, which comprises at least two linear motors, acts like just one linear motor in this regard.

The control unit issues the drive system with commands, in particular with regard to the speed. Moreover, the control unit realizes the already mentioned scaling, by it only activating a specific number of linear motors with a minimal power consumption. The data which contains information relating to the position and speed, for instance, and the data which contains commands to the linear motors, is transmitted between the respective linear motor and the measuring system or the control unit by means of a system for data transmission. A system for data transmission is advantageously also embodied between the measuring system and the control unit. Various bus systems or also Industrial Ethernet can be used for data transmission.

A mechanical implementation is significantly simplified by the invention and an omission of expensive and high-maintenance mechanical transmission components, associated therewith, such as gearbox and/or cam disk and/or crankshaft. Moreover, assembly and handling is facilitated, since less and also smaller parts have to be bound. Linear motors can be kept in stock as spare parts.

If an error occurs in one of the linear motors forming the drive system, whereupon this is no longer fully functional, the pump can also be driven with reduced power since the other linear motors are unaffected by the error that has occurred. The defective linear motor can be replaced quickly and easily; this is looked upon favorably in terms of high machine availability.

Moreover, the invention offers the possibility of realizing a redundancy in the drive system comprising linear motors by installing a larger number of linear motors than is required, by at least one redundant linear motor being introduced into the inventive drive system.

Suited to the invention are both linear motors with moving magnets, what are known as moving magnet linear motors, and also linear motors with moving coils, what are known as moving coil linear motors. However, linear motors with moving magnets are preferably used, since in this regard electric supply lines do not have to be moved for the linear motor. This is advantageous in that a track, upon which the linear motor is moving, can be embodied of any length.

Each linear motor forming the drive system is preferably assigned at least one converter, in particular precisely one converter, which couples the respective linear motor with an electric energy supply network. This enables, inter alia, a simple and rapid exchange of the linear motor in the event of a fault.

A piston rod connected to the piston preferably bundles a force, in particular a feed force, which the linear motors apply.

High forces which require a large power are required to drive a pump. Manufacture, transportation and installation of linear motors embodied as individual motors is very expensive and time-consuming. The invention is advantageous in that the drive system can be used to effect the required high forces, by a piston rod bundling the forces of a number of parallel-connected, smaller linear motors suitable for series production.

BRIEF DESCRIPTION OF THE DRAWING

The invention is explained below on the basis of an example in which FIG. 1 shows a drive system for driving a pump.

DETAILED DESCRIPTION OF PREFERRED EMBODIMENTS

FIG. 1 shows a drive system 3 comprising five linear motors 1a, 1b, 1c, 1d and 1e, which can be moved forwards and backwards on a track 2a, 2b, 2c, 2d and 2e in each case, in order to drive a pump 4, in particular a fuel pump. The linear motors are arranged in parallel and are mechanically connected so that the forces of the linear motors 1a to 1e are bundled by means of a piston rod 7.

Each one linear motor 1a to 1e is coupled in each case with a converter 30a, 30b, 30c, 30d and 30e to an electrical power supply network 40. The linear motors 1a to 1e are connected via electric energy supply lines 31a, 31b, 31c, 31d and 31e to the respectively associated converter 30a to 30e. The converters 30a to 30e are connected to the electric energy supply network 40 by way of further electrical energy supply lines 32a, 32b, 32c, 32d and 32e.

The force of the linear motors 1a to 1e is bundled by means of a piston rod 7. The individual linear motors 1a to 1e advantageously move with the same speed. The piston rod 7 moves a piston 6, in this way, which bounds a working chamber 5 in a cylinder of a pump 4.

Fluid present in the working chamber 5, in particular fuel such as oil or gas, is pressurized as a result. To this end, in an exemplary sequence, fuel is drawn into the working chamber 5 through an inlet vale 11 preferably activated by the control unit 21 by way of a system for data transmission 25, by the drive system 3 comprising linear motors 1a to 1e—and thus each individual linear motor 1a to 1e—receiving the command from the control unit 21, at a rear end of the respective track 2a to 2e which faces away from the pump 4. The working chamber 5 achieves its maximum size as a result and an emerging vacuum in the working chamber 5 draws the fuel in by way of the inlet valve 11.

A measuring system 20 identifies, if each one linear motor 1a to 1e has reached an end position, whereupon the control unit 21 stops the linear motors 1a to 1e. The measuring system 20 is connected to the linear motors 1a to 1e by way of a system for data transmission 26. The measuring system 20 advantageously moreover acquires a speed and position of each one linear motor 1a to 1e and can transmit this data to the control unit 21 via a system for data transmission between the control unit and measuring system 20. The control unit 21 therefore has the possibility to respond, by it braking or accelerating the linear motors 1a to 1e for instance.

The control unit 21 preferably closes both the inlet valve 11 and also the outlet valve 10 when the end position of the liner motors 1a to 1e is reached. To this end an optional system for data transmission is available between the control unit 21 and valves 29.

The drive system 3 comprising linear motors 1a to 1e is prompted by the control unit 21 to move in the direction of a front end of the respective track 2a to 2e which faces the pump. As a result, the fuel located in the working chamber 5 is pressurized. If the pressure is sufficiently large, the control unit 21 opens the outlet valve 10. An extent of the pressure is advantageously detected by means of the measuring system 20 by way of an optional system for data transmission between the measuring system and valves 28.

The control unit 21 and the measuring system 20 can have separate computer units or a shared computer unit. The systems for data transmission 25, 26, 27, 28 and 29 can be connected by means of lines or also wirelessly.

The drive system 3 comprising linear motors shown by way of example in FIG. 1 has just five linear motors 1a to 1e. In accordance with the invention, depending on the application area a larger or smaller number of linear motors can however form a drive system comprising linear motors.

The invention claimed is:

1. A pump, in particular a fuel pump, comprising:
    a cylinder having a working chamber which contains a fluid, in particular fuel;
    a drive system including at least two linear motors which are connected electrically and/or mechanically in parallel;
    a piston movable in the working chamber by the drive system to bound the working chamber in the cylinder and to pressurize the fluid in the working chamber; and
    a piston rod connected to the piston and bundling a force, in particular feed force, applied by the drive system.

2. The pump of claim 1, wherein the drive system includes a measuring system configured to determine a position and/or speed of the linear motors, a control unit for activating the linear motors, and a system linked to the measuring system and control unit for data transmission between the control unit and the measuring system.

3. The pump of claim 1, wherein the linear motors are arranged in parallel on a support.

4. The pump of claim 1, wherein each of the linear motors is embodied as a linear motor with a moving magnet.

5. The pump of claim 1, further comprising converters operably connected to the linear motors in one-to-one correspondence.

6. The pump of claim 1, wherein the drive system includes at least 20 of said linear motors and at most 128 of said linear motors.

7. The pump of claim 1, wherein the linear motors are of a same construction.

* * * * *